H. A. KLINGLER.
SEED PLANTER.
APPLICATION FILED SEPT. 8, 1915.
1,176,222.
Patented Mar. 21, 1916.
2 SHEETS—SHEET 1.
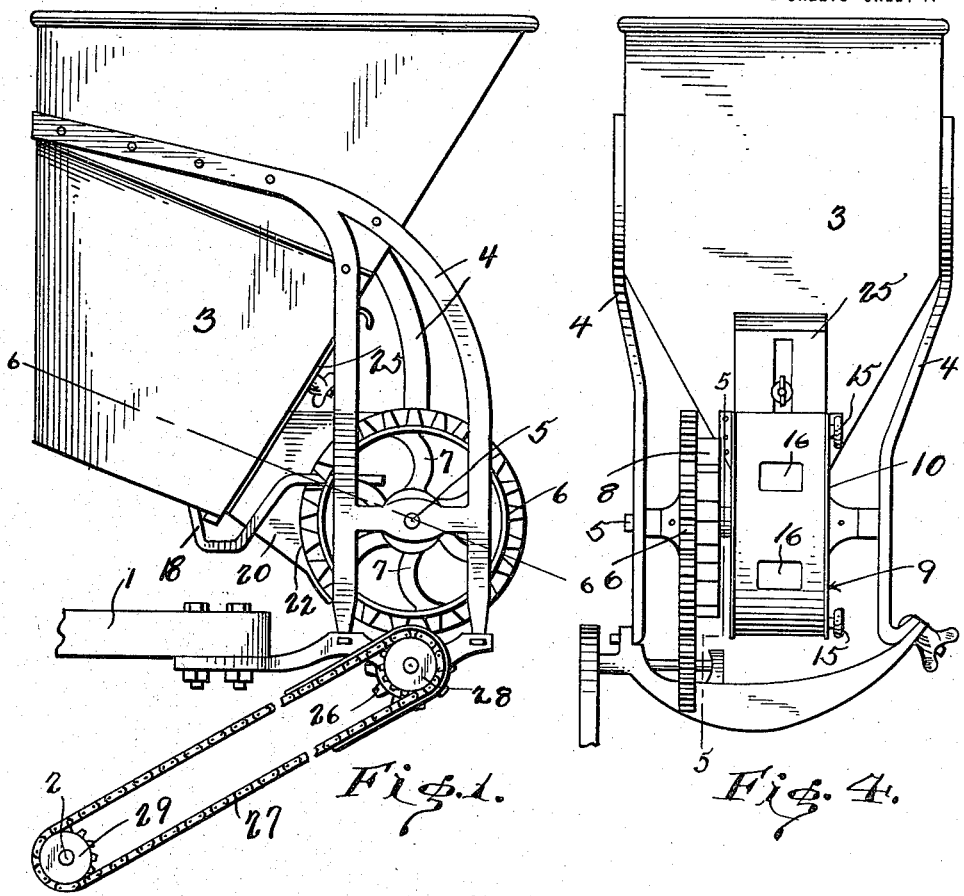
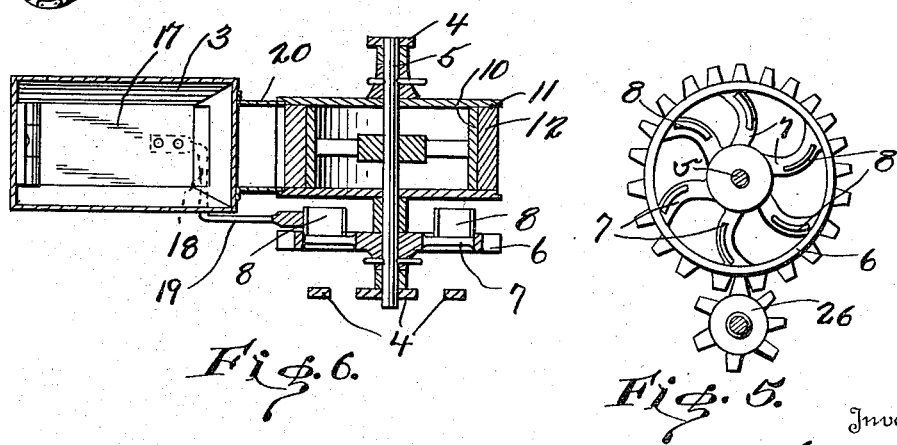

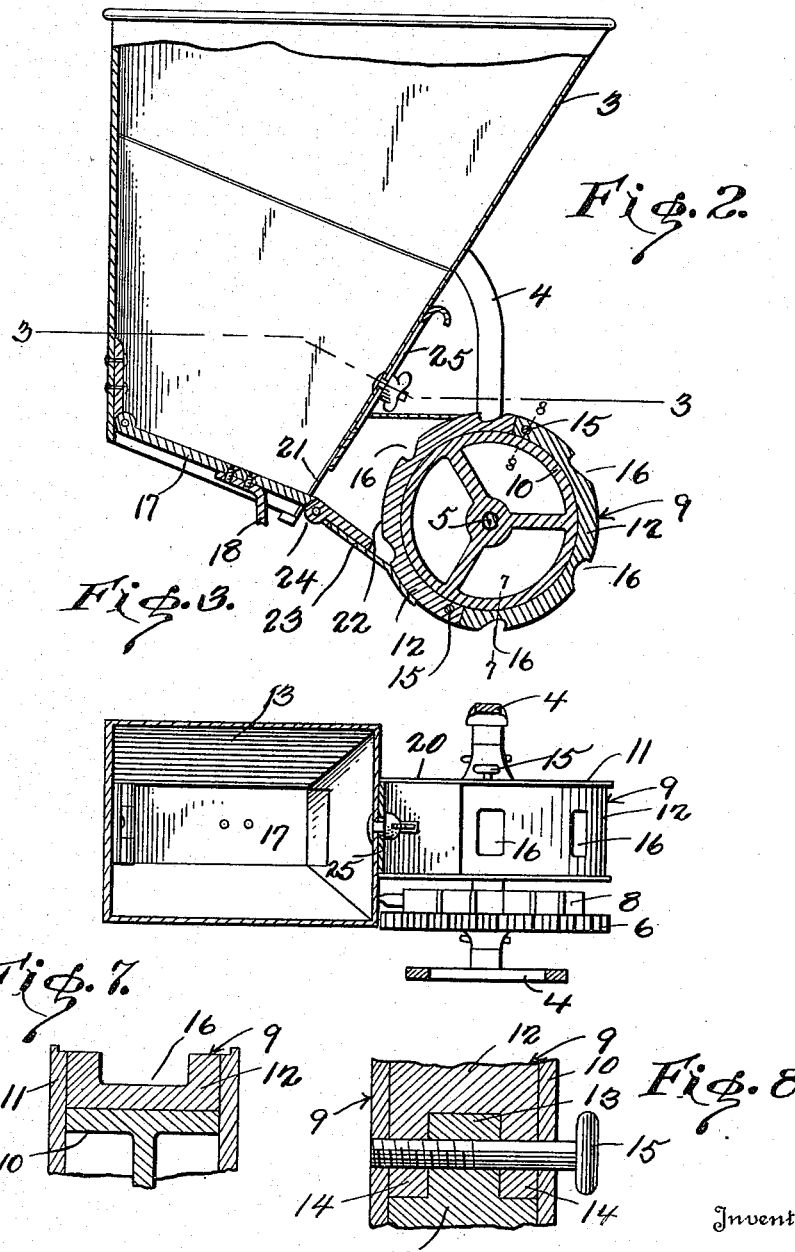

UNITED STATES PATENT OFFICE.

HERMAN A. KLINGLER, OF VERNON, TEXAS.

SEED-PLANTER.

1,176,222.  Specification of Letters Patent.  Patented Mar. 21, 1916.

Application filed September 8, 1915. Serial No. 49,450.

*To all whom it may concern:*

Be it known that I, HERMAN A. KLINGLER, a citizen of Switzerland, residing at Vernon, in the county of Wilbarger, State of Texas, have invented certain new and useful Improvements in Seed-Planters; and I do hereby declare the following to be a full, clear, and exact description of the invention, such as will enable others skilled in the art to which it appertains to make and use the same.

The present invention is directed to improvements in seed planters, and has for its object to so construct a device of this character that the same can be readily attached to a conventional form of lister plow.

A further object of the invention is to provide a planter of this type, having a dropping wheel so constructed that the seed pockets carried thereby may be interchanged for planting different kinds of seed.

A still further object of the invention is to provide a device of this character provided with novel means for vibrating the bottom of the seed containing hopper so as to evenly feed the seed therefrom to the dropping wheel.

A still further object of the invention is to provide a seed planter provided with means for regulating the flow of seed from the hopper to the dropping wheel.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a longitudinal sectional view through the same. Fig. 3 is a sectional view on line 3—3 of Fig. 2. Fig. 4 is a rear elevation. Fig. 5 is a sectional view on line 5—5 of Fig. 4. Fig. 6 is a sectional view on line 6—6 of Fig. 1. Fig. 7 is a sectional view on line 7—7 of Fig. 2. Fig. 8 is a sectional view on line 8—8 of Fig. 2.

Referring to the drawing 1 indicates the frame of a lister plow, which is supported by the wheeled axle 2, said lister plow being of any conventional form.

The planter comprises a hopper 3, which has fixed to its sides brackets 4, the lower ends of which being detachably connected to the side bars of the plow frame 1. Having its ends journaled in the brackets 4 is a shaft 5, which has fixed thereto a gear wheel 6, the spokes 7 of which having formed integral therewith cams 8, the purpose of which will appear later.

Fixed to the shaft 5 is a dropping wheel 9, which has its rim 10 provided with marginal flanges 11, said flanges serving to prevent the sections 12 from moving laterally, said sections being semi-circular in shape so as to conform to the curvature of the rim 10. The sections 12 have their ends provided with coating extensions 13 and ears 14, which are engaged by the bolts 15, said bolts being passed through the flanges 11, and readily removable when it is desired to remove or interchange the sections. As shown in the drawing the sections are provided with pockets 16, which are especially adapted for use when the machine is employed for planting peanuts. By providing the sections 12 it is obvious that the same can be provided with pockets of various shapes and sizes, so that the sections may be interchanged for dropping seed of different character.

Hingedly connected to the front wall of the hopper 3 is a bottom 17, which has fixed to its under surface an arm 18, said arm having an offset extension 19, which is positioned so as to be engaged by the cams 8 carried by the spokes of the gear wheel 6, whereby when rotary movement is imparted to the gear wheel, the bottom 17 will be vibrated so as to feed the seed from the hopper to the pockets of the dropping wheel. A housing 20 is interposed between the dropping wheel and hopper 3, and has its forward end communicating with the interior of the hopper, through the feed opening 21 formed therein. The side walls of the housing 20 are curved, as at 22, so as to conform to the curvature of the peripheries of the sections 12, and with which they engage. The forward end of the bottom 17 has hingedly connected thereto a plate 23, which has its free end slidably engaged with the bottom of the housing. The bottom of the housing has its forward edge spaced from the hopper, so as to provide an opening 24 through which dust or other accumulations may pass. It is obvious that the constant movement of the plate 23 will feed the accumulations to the opening 24.

A slide 25 is adjustably connected to the rear wall of the hopper 3, and is operable to regulate the flow of seed from the hopper through the feed opening 21.

A pinion 26 is suitably supported on the plow frame 1, and is adapted to mesh with the gear wheel 6, said pinion being driven by the sprocket chain 27, which is trained around the sprocket wheel 28, and the sprocket 29 carried by the axle 2.

From the foregoing description it will be seen that the device can be readily placed upon a conventional form of lister plow, and when in place thereon will drop seed rearwardly of the shovel thereof, even feeding of the seed being assured by the vibration of the bottom 17.

What is claimed is:—

1. A device of the class described comprising a frame, a hopper on the frame, a dropping wheel, a housing between the dropping wheel and hopper, said hopper having a vibrating bottom, and a plate hingedly connected to the bottom for slidably engaging the housing bottom during vibration of the hopper bottom.

2. A device of the class described, comprising a wheeled frame, a hopper removably mounted on the frame, a dropping wheel associated with the hopper, means for rotating the dropping wheel, a housing arranged between the hopper and the dropping wheel, a vibrating bottom for the hopper, said bottom having a plate hingedly connected thereto and slidably engaging the bottom of the housing during vibration of the bottom.

3. A device of the class described, comprising a wheeled frame, a hopper having brackets secured thereto and adapted to removably engage the frame, a shaft journaled in the brackets, a dropping wheel fixed to the shaft and having sections interchangeably engaged therewith, said sections being provided with seed receiving pockets, a gear wheel carried by the shaft, cams carried by the gear wheel, a bottom hingedly mounted in the hopper, an arm fixed to the bottom and having an offset extension adapted to engage the cams to impart vibratory movement to the bottom during the rotation of the gear wheel, and means for simultaneously rotating the gear wheel and dropping wheel.

In testimony whereof, I affix my signature, in the presence of two witnesses.

HERMAN A. KLINGLER.

Witnesses:
F. L. MASSIE,
S. A. WHITE.

Copies of this patent may be obtained for five cents each, by addressing the "Commissioner of Patents, Washington, D. C."